United States Patent [19]

Benson

[11] 4,054,156
[45] Oct. 18, 1977

[54] EXHAUST BRAKE VALVE

[75] Inventor: John Benson, Tigard, Oreg.

[73] Assignee: The Weatherhead Company, Cleveland, Ohio

[21] Appl. No.: 552,658

[22] Filed: Feb. 24, 1975

[51] Int. Cl.$^2$ .............................................. F16K 3/02
[52] U.S. Cl. ............................ 137/630.12; 123/97 B; 188/273; 251/60; 251/63.4; 251/63.6; 251/214; 251/285; 251/337
[58] Field of Search ................... 137/630, 102, 630.12, 137/630.14, 630.15; 251/214, 285, 337, 77, 326, 11, 60, 63.4, 63.6; 60/324; 123/97 B; 188/273

[56] References Cited

U.S. PATENT DOCUMENTS

| | | | |
|---|---|---|---|
| 997,038 | 7/1911 | Brummer | 251/60 X |
| 1,348,604 | 8/1920 | Titus | 251/63.4 |
| 1,412,473 | 4/1922 | Lane | 137/102 |
| 1,506,012 | 8/1924 | Lewis | 137/102 UX |
| 1,727,591 | 9/1929 | Fridstein et al. | 251/285 X |
| 2,062,126 | 11/1936 | Gibson | 251/337 X |
| 2,241,324 | 5/1941 | Selby | 251/60 X |
| 2,709,897 | 6/1955 | Millikan | 251/326 X |
| 2,800,112 | 7/1957 | Williams | 123/97 B |
| 2,873,761 | 2/1959 | Tailleferre | 137/630.12 X |
| 2,997,851 | 8/1961 | Trubert | 251/63.4 X |
| 3,036,807 | 5/1962 | Lucky et al. | 251/77 X |
| 3,136,332 | 6/1964 | Nixon | 251/285 X |
| 3,221,770 | 12/1965 | Faisandier | 137/625.68 X |
| 3,333,814 | 8/1967 | Sargent | 251/326 X |
| 3,420,262 | 1/1969 | O'Neill | 251/214 X |
| 3,621,878 | 11/1971 | Smith | 137/595 |
| 3,851,658 | 12/1974 | Bunyard | 137/102 |
| 3,895,648 | 7/1975 | Stoll et al. | 137/102 |

Primary Examiner—Robert G. Nilson
Attorney, Agent, or Firm—McNenny, Pearne, Gordon, Gail, Dickinson & Schiller

[57] ABSTRACT

An exhaust brake valve assembly structurally arranged to provide reliable operation with relatively quick response. The assembly includes a sliding gate valve member driven by a power actuator through a lost motion connection which generates a desirable impact force on the gate to overcome static frictional forces. The lost motion connection cooperates with a relief port in the gate to relieve peak pressure forces on the gate just prior to opening movement to additionally improve opening reliability and response. Still further, the actuator includes a spring return arrangement in which the force rate adjacent the closed gate position is substantially greater than the force rate at the open position so that adequate reserve return force is developed for opening while only a minimal spring force resists piston movement in the initial opening movement. A quick release valve is provided on the actuator to rapidly exhaust fluid from the working chamber of the actuator to develop a high level of kinetic energy during the lost motion period. The actuator is protected from extreme temperature by a heat barrier plate interposed between the valve housing and actuator. A piston rod of the actuator is sealed by a radially floating seal and includes a reduced diameter portion and opposed shoulders for simple connection with the valve gate.

19 Claims, 6 Drawing Figures

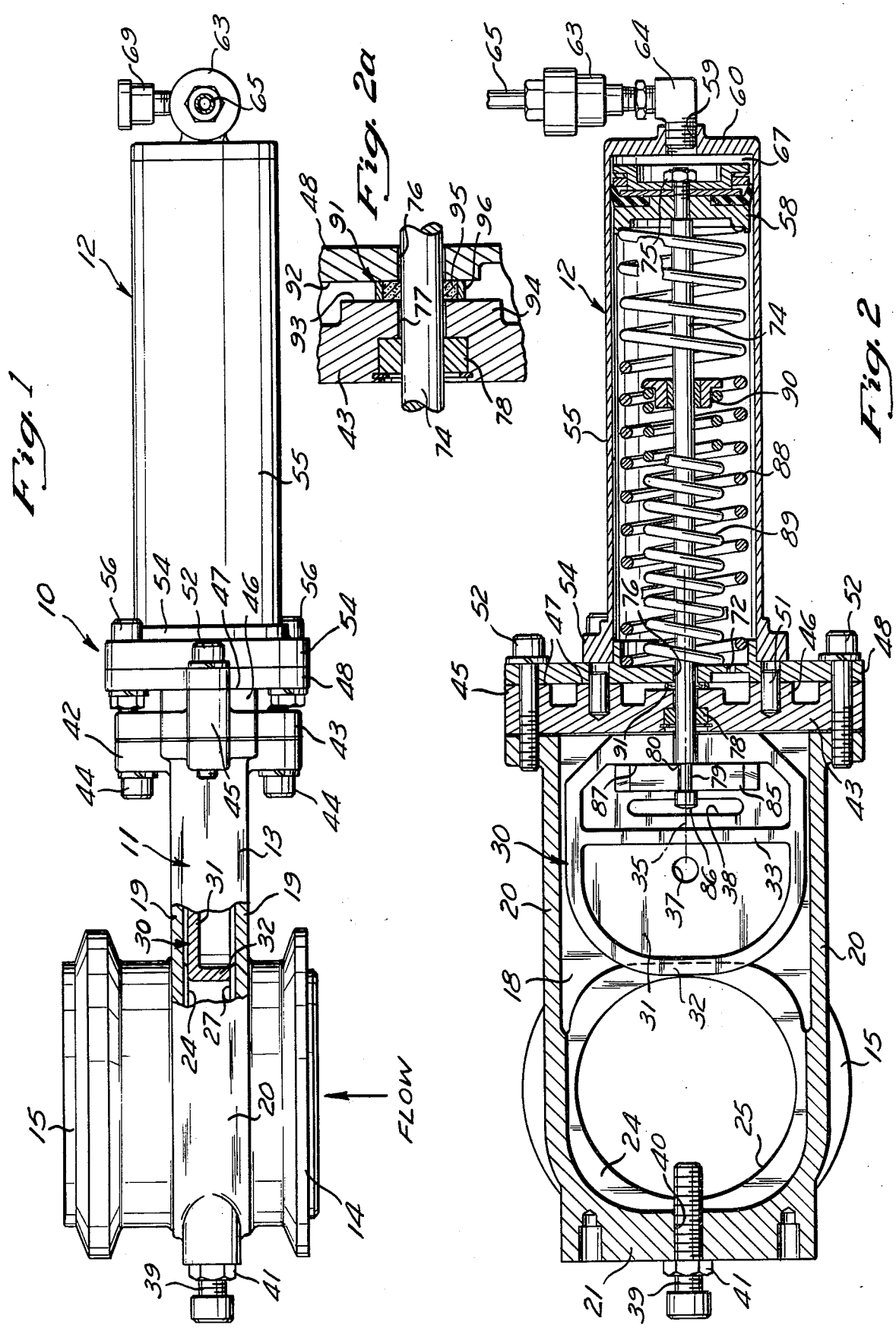

4,054,156

EXHAUST BRAKE VALVE

BACKGROUND OF THE INVENTION

The invention relates to valve assemblies and, in particular, to improvements in exhaust brake valve assemblies.

PRIOR ART

An exhaust brake valve is installed in the exhaust pipe circuit to controllably restrict escape of exhaust gas from an internal combustion engine driving a wheeled vehicle or other load. Exhaust gas restriction by the valve transforms the engine into a compressor, driven by the wheels, capable of retarding motion of the vehicle. The action of an exhaust brake valve is known to prolong the service life of the brakes and engine of a vehicle.

Generally, exhaust brake valves have been either of the butterfly type or of the sliding gate type. The sliding gate type, typically, provides more inherent self-cleaning action against buildup of excessive carbon deposit than that generally found in the butterfly type. The sliding gate, however, usually requires somewhat higher actuating forces than the butterfly valve because of surface friction between the gate and its associated seat. In a relatively large diameter exhaust line, and particularly where high compression pressures are involved, the frictional forces on a gate are of considerable magnitude and may present difficulties in achieving immediate response and reliable valve operation. Examples of the prior art are shown in U.S. Pat. No. 1,752,229 to Brueckel; Australian Patent No. 230,876 to Smith, published Dec. 3, 1959; French Patent No. 1,122,341, published Sept. 5, 1956; and German Patent No. 728,503, issued Nov. 27, 1942.

SUMMARY OF THE INVENTION

The invention provides a sliding gate valve and actuator assembly having structural features which provide improved performance characteristics of reliable operation and fast response. These structural features are combined, in accordance with the invention, to produce valve opening forces of adequate reserve without corresponding increases in valve closing forces whereby frictional forces are reliably overcome in valve opening movement and only limited energy is required for responsive closing movement of the valve.

In the disclosed embodiment of the invention, the compression brake valve includes a lost motion connection between a control rod and the valve member or gate to utilize the kinetic energy of the related valve control elements, to reliably overcome static frictional forces on the gate. Additionally, in the preferred embodiment, elements of the lost motion connection include a waste gate valve to relieve the high forces of peak pressure on the gate prior to its initial movement. The lost motion connection between the control rod and gate also includes an interlocking slot and rod arrangement facilitating assembly and disassembly of the associated elements. Ideally, an adjustable stop is disposed within the housing of the valve to directly engage the gate and thereby advantageously limit movement of the gate to less than that of full closure where necessary or desired in a particular installation.

As disclosed, a power actuator of the valve assembly includes a single acting piston and cylinder which is pressurized for closing the valve and is spring returned for opening the valve. The spring return includes means for substantially increasing the spring biasing force rate at or adjacent the closed valve position compared to the open position. This feature complements the above-described lost motion connection to assure an adequate return force for reliably opening the valve, while avoiding excessive spring biasing forces at the open position of the valve, which would otherwise limit the speed of closing response. The differentially changing spring rate, additionally, cushions the deceleration of the gate valve in closing to reduce impact loads on the various valve elements and provides a similar effective reduction in loading upon opening movement.

To ensure that sufficient speed, and therefore impact energy, are developed in the valve and actuator elements during the lost motion period, an exhaust valve is provided to quickly evacuate the piston chamber. The exhaust valve, mounted on the actuator, includes control means for venting fluid through a port immediately adjacent the piston chamber whereby exhaust flow is not restricted by return through a control line. Rapid exhausting of the piston chamber permits the actuator return springs to accelerate the piston and other elements to an adequate speed during the lost motion period.

An important feature of the invention is a mounting arrangement in which the power actuator is removably mounted on the housing of the exhaust brake valve with a structure which limits heat transmission from the housing to the actuator to thereby avoid subjecting the actuator to extreme temperature service. The disclosed mounting arrangement includes a heat barrier spacer plate having integral, axially extending projections interposed between the valve housing and the actuator. The projections have a total cross sectional area substantially less than that of an adjacent end face of the housing and have substantial spacing therebetween whereby heat transmission is reduced by reduction in contact area and by heat loss to the air surrounding the projections.

Associated with the piston rod of the actuator is a seal assembly adapted to prevent exhaust gas contaminants from entering the piston cylinder which would otherwise foul sliding surfaces in the actuator. The seal assembly is positioned over the piston rod and is axially compressed between the heat barrier plate and a surface at the forward end of the actuator. The surfaces associated with the seal assembly are arranged to permit the assembly to shift radially so that true concentricity with the piston rod may be achieved.

BRIEF DESCRIPTION OF THE DRAWING

FIG. 1 is an elevational view of a valve assembly constructed in accordance with the invention.

FIG. 2 is a sectional view of the assembly of FIG. 1, taken through the plane of the gate housing and longitudinal axis of the actuator.

FIG. 2a is an enlarged, fragmentary, cross sectional view of a piston rod seal assembly of the invention.

DESCRIPTION OF THE PREFERRED EMBODIMENT

Figure 3:
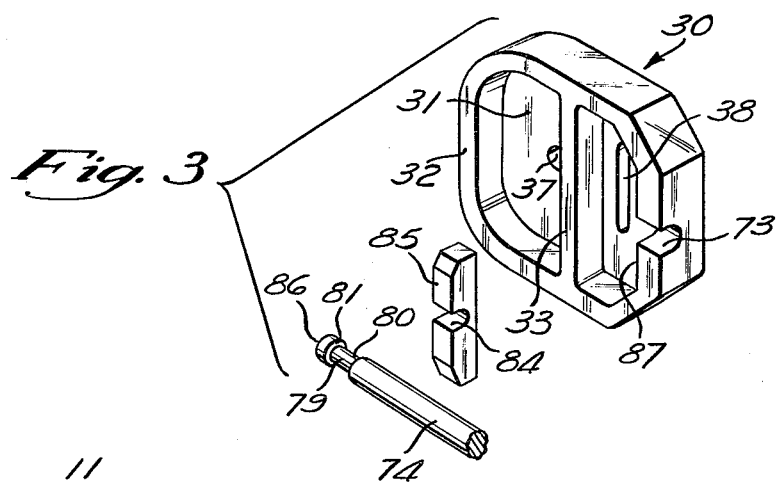
FIG. 3 is a laterally exploded, perspective view of the sliding gate showing structural details and the connection of the piston control rod and sliding block.

Referring now to the drawing, there is shown a valve assembly 10 having a gate valve housing 11 and a power actuator 12. The housing 11 is an integral, hollow casting having a generally planar midsection 13 and oppositely facing circular flanges forming an inlet 14 and outlet 15, respectively. The material selected for forming the housing 11 is a metal suitable for service in the high-temperature environment produced by internal combustion exhaust gases. The housing midsection 13 includes a shallow, rectangular chamber 18 defined within major opposed walls 19, transverse to flow through the inlet 14 and outlet 15, opposed sidewalls 20, and an end wall 21. A machine-finished surface or seat 24 is peripherally disposed about a flow passage 25 centrally formed through the inlet 14 and outlet flange 15. A flat machined surface 27 (FIG. 1) is in spaced, parallel relation to the seat 24 to provide guided sliding engagement of a gate or valving member 30 therebetween.

The gate 30 is a generally cup-shaped body cast or otherwise formed of heat-resistant metal. The gate 30 includes a generally planar web 31 having an integral peripheral flange 32. Integral with the web 31 and flange 32 is a central rib 33 extending transversely to a central axis 35 extending through the actuator 12. The right-hand portion of the chamber 18 is dimensioned such that substantially the full body of the gate 30 is received therein when in its illustrated retracted open position so that the flow passage 25 is unobstructed by any portion of the gate. The gate 30 is slidable in the chamber 18 leftwardly from the illustrated retracted position to progressively close the flow passage 25. The leftward or closed position of the gate is determined by means of an adjustable stop bolt 39 extending into the chamber 18. The bolt 39 is threaded into a bore 40 in the housing end wall 21 coincident with the actuator axis 35. A lock nut 41 is provided on the bolt 39 and is tightened against the end wall 21 to secure the bolt in a desired position. A transversely elongated aperture 38 through the gate web 31 provides controlled relief for excessive pressure in a manner described below. A second relief or bleed port 37 may be provided in the gate web 31 to ensure that a minimum exhaust flow is maintained. This minimum flow is particularly important in exhaust circuits which include a turbocharger for the purpose of maintaining minimum turbine speed.

A base plate or cap 43 (FIG. 4), forming an end wall for the chamber 18, is removable secured to the housing 11 by bolts 44 to permit removal of the gate 30 for servicing. The plate 43 is preferably cast or otherwise formed of a ferrous alloy or other suitable metal. A pair of radially outward circular bosses 45 and a pair of inward rectangular bosses 46 define a common plane or surface 47 on which a cylinder adapter plate 48 is mounted. The bosses 45 and 46, integral with the base plate 43, serve as a heat barrier between the housing 11 and actuator 12. Heat transfer between the housing 11 and actuator 12 is substantially reduced by the limited area of the bosses 45, 46 from that which would result where the adapter plate 48 or other element at the forward end of the actuator 12 contacted a surface area as large as that encompassed by the outer periphery of an end flange 42 of the housing 11 which the barrier plate 43 abuts.

Besides providing reduced contact area on the adapter plate 48, the bosses 45, 46 allow air circulation between the housing 11 and actuator 12, permitting cooling of all exposed surfaces of the barrier plate 43 and adapter plate. Further, the axial length of the bosses or projections 45, 46 spaces the actuator 12 a corresponding distance from the housing 11. Reduction of heat transmission by the barrier plate 43 allows the actuator 12 to operate at a reduced temperature, thereby extending its service life. The cylinder adapter plate 48 is located on the base plate 43 by pins 51 and is secured to the housing 11 by bolts 52.

A head or rod end 54 of a cylinder 55 of the actuator 12, in turn, is secured to the adapter plate 48 by bolts 56. The actuator 12 includes a piston 58 slidable in the cylinder 55. A central inlet or port 59 is provided in an end wall 60 at the rear or piston end of the cylinder 55. A quick release valve 63 of known construction is mounted on the actuator 12 and is connected to the inlet 59 by a fitting 64. The valve 63 conducts pressurized fluid, normally air, from a control line 65 to the inlet 59 to pressurize a piston chamber 67.

Figure 5:
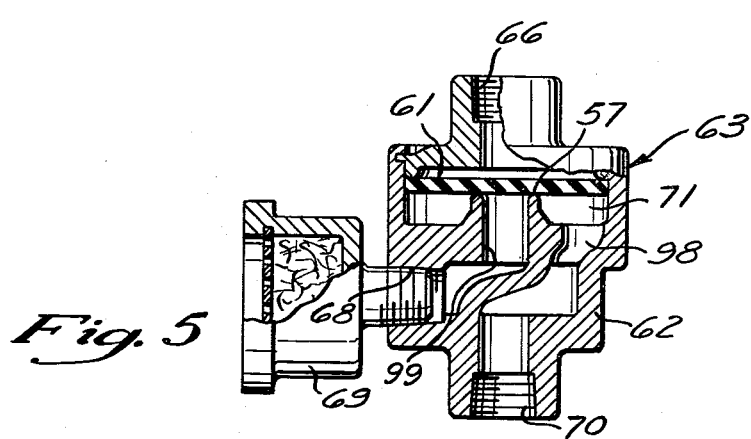
FIG. 5 is a cross sectional, elevational view of a quick release valve carried by the actuator.

Referring specifically to FIG. 5, the valve 63 includes a housing 62 having an inlet 66, an outlet 70, and an exhaust port 68. The inlet 66 communicates with the control line 65, while the outlet 70 communicates with the fitting 64. Within the housing 62 is a circular chamber 71 in which is received an elastomeric diaphragm 61. The diaphragm 61 is adapted to controllably seal a central seat 57. When pressure at the inlet 66 and on the upper side of the diaphragm 61 in the orientation of FIG. 5 is greater than that below the diaphragm, fluid flows peripherally over the diaphragm and through an internal passage 98 to the outlet 70, and ultimately to the piston chamber 67, while the seat 57 is sealed by the diaphragm. When pressure on the underside of the diaphragm 61 is greater than on the upper side, such as when the line 65 is depressurized, the seat 57 is uncovered and fluid from the piston chamber 67 is exhausted from the port 70 through the passage 98 and a central passage 99 associated with the seat, and finally to the exhaust port 68. The valve 63 is thus effective to release air from the piston chamber 67 through the exhaust port 68 on which a breather filter 69 is fitted. This avoids requiring air in the chamber 67 to travel the necessarily restrictive path of the control line 65 to a remote control valve. A vent 72 in the adapter plate 48 provides communication between the rod side of the piston 58 and the atmosphere.

A piston or control rod 74 of stainless steel or other heat resistant metal is secured to the piston 58 by a nut 75. The rod 74 extends along the cylinder axis 35 through aligned bores 76 and 77 in the adapter plate 48 and barrier plate 43, respectively, and through an open-faced slot 73 in the gate flange 32. The rod 74 is laterally supported in a guide bushing 78 in the barrier plate 43. A working or forward end of the rod 74 is machined or otherwise formed with a reduced diameter portion 79 and opposed shoulders 80 and 81. The reduced diameter portion 79 is assembled in a suitably dimensioned open-faced slot 84 in a block 85. With the gate 30 out of the housing 11, assembly and disassembly of the rod 74 with the gate and block 85 are accomplished by simply moving the rod laterally in and out of the respective slots.

The block 85 is slidably disposed in a cavity formed between the central rib 33 and a surface 87 of the rightward portion of the peripheral flange 32. The block 85 is formed of a metal, such as stainless steel, suitable for service in a high-temperature environment. Under the influence of the piston rod 74, the block 85 slides relative to the gate 30. The block 85 is arranged as a secondary valving member to cover the relief port or aperture 38 when the piston 58 is driven to the left. Sliding action of the block 85 relative to the gate 30, until a forward end face 86 of the piston rod 74 strikes the rib 33, provides a lost motion connection between the rod and gate. In the embodiment illustrated, the lost motion of the block is apporoximately ½ inch.

Referring to FIG. 2a, a seal assembly 91 is positioned over the piston rod 74 between a forward face 92 of the adapter plate 48 and a radial face 93 of a central boss 94 integral with the barrier plate 43. The central boss 94 is somewhat shorter than the axial length of the bosses 45 and 46 so that with the adapter plate bolted against the boss surface 47, the surfaces 92 and 93 are spaced a predetermined distance. The seal assembly 91 includes a high temperature service sealing material 95, such as graphite-asbestos, which is provided in a washerlike structure. Ideally, the material 95 has an original axial length somewhat greater than the spacing between the surfaces 92 and 93, so that upon assembly of the plates 43 and 48, it is axially compressed into tight sealing engagement with these surfaces and radially tightened into sealing contact with the rod 74. The sealing material 95 is radially confined by a band 96 of suitable metal having an axial length slightly less than the spacing between the surfaces 92 and 93 so that the band prevents radial extrusion of the material 95. The asembly 91 is unconfined radially by the adjacent surfaces 92, 93 so that it remains concentric with the piston rod 74 despite slight positional variations of the rod relative to the plates 43 and 48, due to tolerances in manufacture.

The piston 58 is normally biased to the illustrated leftward position by means of a helical compression spring 88 within the cylinder 55 and concentrically disposed about the axis 35. A second spring 89 is concentrically disposed within the first spring 88 but has an axial length somewhat shorter than the first spring. As shown, the length of the second spring 89 is apporoximately one-half that of the working length of the major spring 88, so that it is effective on the piston 58 only after the piston has traveled a substantial portion of its stroke to its extended position. Further, the second spring 89 is dimensioned to provide a spring rate substantially greater than that of the first spring 88. By way of example, with a nominal diameter of 4 inches at the flow passage 25 and a similar piston stroke, the first or main spring 88 is dimensioned for a spring rate of approximately 20 lbs./in., with a pretension in assembly of about 1 inch, while the second spring 89 has a spring rate of approximately 134 lbs./in. and is not effective by engagement with the piston 58 until the latter has traveled about three-quarters of its stroke to the closed or leftward position. The piston end of the secondary spring 89 is concentrically supported by a bushing 90 freely slidable on the piston rod 74.

The valve assembly 10 is installed in an exhaust system of a vehicle by clamping or otherwise securing the flanges 14 and 15 in a conventional manner to lengths of exhaust pipe at an appropriate location. The vehicle may be compression braked through the drive line and engine by energizing the actuator 12 to cause the flow passage 25 to be restricted by the gate 30. More specifically, pressurized air is directed to the line 65 from a valve which, for example, may be actuated in response to movement of the engine throttle linkage to its idle position. Air pressure in the chamber 67 acts on the piston 58 to drive the piston 74 to the left. Initial movement of the rod 74 causes the block 85 to slide relative to the gate 30 and cover the relief or waste port 38. At this time, the rod end face 86 strikes the gate rib 33 with a slight impact to overcome any static frictional forces between the gate and housing surfaces. Thereafter, the piston rod 74 drives the gate 30 to a closed position against the stop bolt 39 or against the end wall 21 where no bolt is provided.

The exact position of the bolt 39 is ideally determined after installation of the valve assembly 10 and during engine operation at the idle throttle position so that the maximum restriction developed by the assembly is tailored to a particular installation.

The second spring 89 is not effective during the first portion of the valve closing stroke of the piston 58, so that only the minimum resistance provided by the first spring 88 resists initial closing movement. The valve assembly 10 is thereby quicker to respond to a given pressure signal from the line 65 than an assembly having a single spring with an effective stiffness equivalent to both of the springs 88 and 89. As indicated above, the spring rate of the second spring 89 becomes effective only after the piston 58 has moved a major portion of its stroke. In the last portion of the piston stroke, the second piston 89 assists in absorbing the energy of the piston 58 and rod 74 to reduce impact loading at the end of the stroke.

When braking is no longer desired, pressure in the piston chamber 67 is reduced by relief of pressure in the line 65. Exhausting of the chamber 67 allows the springs 88 and 89 to return the piston 58 toward its retracted position. Initial rightward piston 58 and rod 74 movement causes the block 85 to uncover the port 38 and relieve high exhaust pressure on the upstream side of the gate. Continued movement of the piston and rod causes the block 85 to strike the gate surface 87 with sufficient impact to overcome static frictional forces on the gate. Such frictional forces may be considerable, owing to the normally expected exhaust pressures ranging between 35 and 40 psi and up to 75 psi.

Additionally, the compressive forces in both of the springs 88 and 89 are effective in the first portion of the return stroke to provide, with the impact action of the block 85, a sufficient margin of force to reliably return the gate to its rest position. In addition to providing reserve opening force, the second spring provides quicker opening response than that which would be available with only the main spring 88. Immediate evacuation of the piston chamber 67 by the quick release valve 63 allows rapid acceleration of the piston 58 and a high level of kinetic energy to be developed during the lost motion period.

Figure 4:
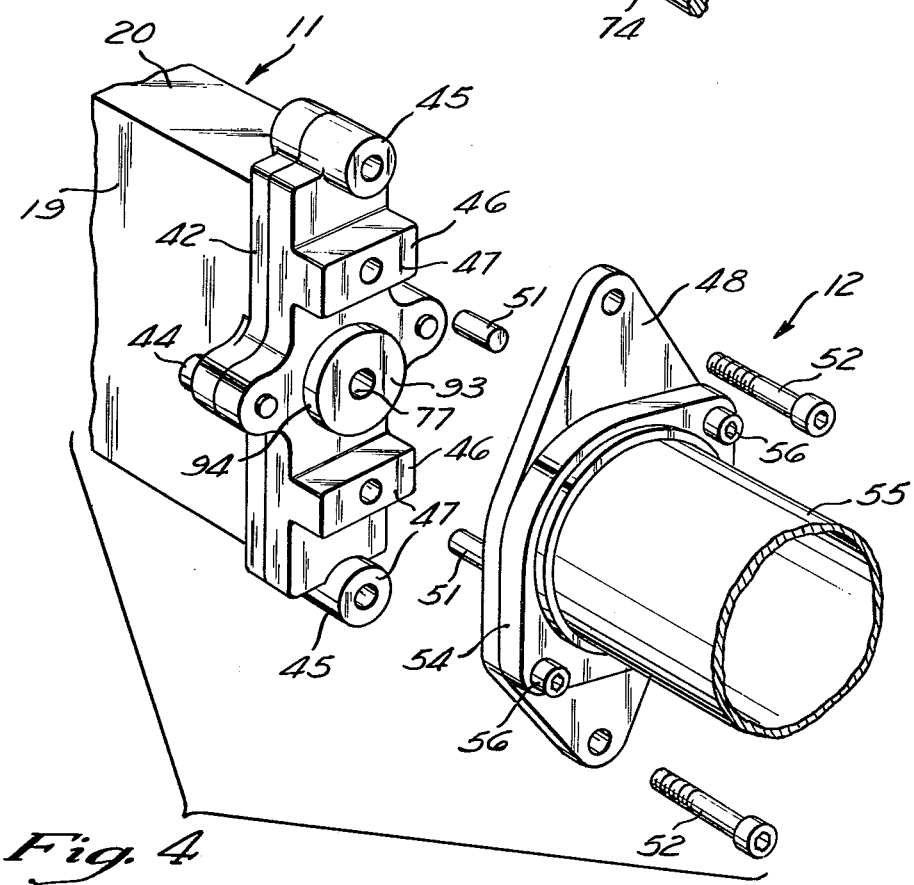
FIG. 4 is an axially exploded, fragmentary view of the mating area of the valve housing and actuator.

Referring to FIG. 4, disassembly of the actuator 12 and/or the gate 30 from the housing 11 for inspection or service without removal of the latter from the exhaust circuit is facilitated by the disclosed structure. The cylinder 55 may be removed from the housing to expose the piston 58 and rod 74 by separation at the plane between the cylinder head 54 and the adapter plate 48 by removal of the bolts 56. The entire actuator 12 and gate 30 may be removed from the housing 11 by separation of the heat barrier plate 43 from the housing flange 42 with removal of the bolts 52 and 44.

While the invention has been described in connection with specific embodiments thereof, it is to be clearly understood that this is done by way of example, and not as a limitation to the scope of the invention as set forth in the objects thereof and in the appended claims.

What is claimed is:

1. An exhaust brake valve comprising a housing having an inlet and outlet, a passage within said housing providing a gas flow path between said inlet and outlet, a valve seat within said housing defining a peripheral boundary around said passage, a valve member in said housing adapted to close said valve seat to restict said passage, a control member adapted to be connected to a power actuator external of said housing for selectively opening and closing said valve member on said valve seat, lost motion connection means between said valve member and said control member, and means for adjustably limiting the closed position of said valve member to less than complete sealing engagement with said seat, said limiting means including means operative to effect selective postioning of said valve member for limiting closure on said seat independently of said lost motion connection means, said operative means being disposed within said housing and being directly engageable with said valve member, said valve member being a generally planar gate slidably disposed for reciprocation in its plane between its open and closed positions, said lost motion connection means being constructed and arranged to provide an amplitude of lost motion in the order of about one-eighth of the displacement of the valve member between its open and closed positions.

2. A valve as set forth in claim 1, wherein said limiting means is a threaded stop member extending through an end wall of the housing into the path of said gate, the longitudinal axis of said threaded member being parallel to the direction of reciprocation of said valve member.

3. A valve as set forth in claim 2, wherein said control member is a rod mounted relative to said housing for reciprocation along its axis, said threaded member being substantially coaxial with said rod.

4. A valve as set forth in claim 1, including a power actuator, said actuator having piston means responsive to fluid pressure to close said valve member, and spring means resisting movement of said piston means and biasing said valve member towards its open position.

5. An exhaust brake valve comprising a housing having an inlet and outlet, a passage within said housing providing a gas flow path between said inlet and outlet, a valve seat within said housing defining a peripheral boundary around said passage, a valve member in said housing adapted to close said valve seat to restrict said passage, a control member adapted to be connected to a power actuator external of said housing for selectively opening and closing said valve member on said valve seat, lost motion connection means between said valve member and said control member, and means for adjustably limiting the closed position of said valve member to less than complete sealing engagement with said seat, said lost motion connection means including a secondary valving member, said first-mentioned valve member including a relief port, said secondary valving member being adapted to seal said relief port when said first-mentioned valve is in its closed position, and being adapted to open said relief port when said control member initiates opening movement of said first-mentioned valve member.

6. In an exhaust system of an internal combustion engine a compression brake valve for an internal combustion engine comprising a housing having an inlet and an outlet, a passage within said housing providing a gas flow path between said inlet and outlet, a valve seat within said housing defining a peripheral boundary on said passage, a valve member in said housing adapted to close the valve seat, a control member adapted to be connected to power actuating means external of said housing and operatively connected to said valve member for selectively and forcibly opening and closing said valve member on said valve seat between open and closed positions, means for adjustably limiting the closed position of said valve member to less than complete sealing engagement with said seat, said limiting means including an element within said housing in direct engagement with said valve member when the valve member is in its closed position, and lost motion connection means interposed between said control member and said valve member, said lost motion connection means being constructed and arranged to provide an amplitude of lost motion in the order of about one-eighth of the displacement of the valve member between its open and closed positions.

7. An exhaust brake valve comprising a housing having an inlet and an outlet, a passage within said housing providing a gas flow path between said inlet and outlet, a valve seat in said housing defining a peripheral boundary around said passage, a valve member in said housing adapted to close said valve seat to restrict said passage, a control member for selectively opening and closing said valve member on said seat, power actuator means external of said housing for moving said valve member through said control member, said actuator means including piston means responsive to fluid pressure for closing said valve member, spring means resisting movement of said piston means and biasing said valve member towards its open position, said spring means including means for substantially increasing the rate of biasing force for opening said valve member in or adjacent its closed position compared to the force rate applied by said spring means to bias the valve member when the valve member is in its open position, said spring means including first and second springs operative to bias said valve member, the second spring having a length substantially shorter than the operating length of the first spring and being arranged to bias said valve member only when said valve member is in or adjacent its closed position, said second spring having a compression rate substantially greater than said first spring.

8. A valve as set forth in claim 7, wherein said valve member is a slide gate, said control member being a rod connected between said piston means and said gate, said springs being coaxially arranged with said rod.

9. An exhaust brake valve comprising a housing having an inlet and outlet, a passage within said housing providing a gas flow path between said inlet and outlet, a valve seat within said housing defining a peripheral boundary around said passage, a sliding gate valve member in said housing adapted to close said valve seat to restrict said passage, a power actuator external of said housing for selectively opening and closing said valve member on said valve seat, said actuator including piston and cylinder means responsive to fluid pressure for closing said valve member, a piston rod connected to the piston of said piston and cylinder means and extending axially through the cylinder of said piston and cylinder means, lost motion connection means between said piston rod and said valve member, said actuator including spring means resisting movement of the piston and biasing said valve member towards its open position, said spring means including a first spring within the cylinder and concentric about said piston rod, said first spring being arranged to operate on said piston substantially through its full stroke, said spring means including a second spring within the cylinder and concentric about said piston rod, said second spring being arranged to operate on said piston only when said piston is in or adjacent a valve member closing position, said spring means substantially increasing the rate of biasing force for opening said valve member in or adjacent its closed position compared to the force rate applied by said spring means to bias the valve member when the valve member is in or adjacent its open position, said spring means being capable of fully opening said valve member.

10. An exhaust brake valve as set forth in claim 9, including adjustment means for selectively limiting the closed position of said valve member, said adjustment means including an element within said housing directly engageable with said valve member.

11. An exhaust brake valve as set forth in claim 10, wherein said valve member includes a relief port therethrough, said lost motion connection means including means to seal said relief port when said valve member is moved to said closed position and open said relief port when said valve member is moved to said open position.

12. An assembly comprising an exhaust brake valve and a power actuator for controlling the exhaust brake valve, said brake valve including a housing, means for mounting said actuator on a face of said housing, heat barrier means for limiting heat conduction from said housing to said actuator, said heat barrier means including projection means spacing said actuator from said housing, said projection means having a cross sectional area substantially less than the area of said housing face, said projection means including a plurality of boss elements spaced laterally about a control rod extending between said actuator and said housing, said boss elements being integral with a plate forming a wall on said housing.

13. An assembly as set forth in claim 12, wherein said actuator is secured to said housing by mounting bolts extending into a plurality of said bosses.

14. In combination, an exhaust brake valve having a valving element operable between an open and closed position to selectively restrict flow of exhaust gas, a fluid power actuator, means connecting said fluid power actuator to said valving element for moving said valving element between said open and closed positions, said connecting means including lost motion means between said actuator and said valving element, a control line connected to said fluid power actuator for supplying pressurized fluid to a working chamber of said actuator, and control means for quickly releasing fluid from said chamber through a path separate from said control line, said separate path including an exhaust port immediately adjacent said actuator, said actuator including spring means for returning said valving element from the closed position to the open position, said spring means being arranged to move a portion of said connecting means during its period of lost motion at a relatively high rate of acceleration due to quick release of fluid by said control means whereby a high level of kinetic energy is developed to reliably open said valving element.

15. The combination as set forth in claim 14, wherein said valving element is a sliding gate, said actuator having a piston and cylinder, and said connecting means includes a piston rod.

16. The combination as set forth in claim 15, wherein said quick release control means includes a valve carried on said actuator.

17. An assembly comprising an exhaust brake valve and an actuator, said valve having a housing including a wall at one side thereof, a plate for mounting said actuator on said valve housing, said wall and plate providing opposed spaced surfaces, a control rod extending through holes in said wall and plate surfaces, a seal around said piston rod, said seal being axially compressed between said surfaces, said seal having a compressed axial length at said rod substantially limited to the spacing between said surfaces and thereby being free to move laterally with respect to said holes to remain concentric with said control rod.

18. An assembly as set forth in claim 17, wherein said seal is an assembly of a high temperature sealing material and an annular band radially engaging and confining said material, said band having an axial length slightly less than the spacing between said surfaces.

19. An exhaust brake valve comprising a housing having an inlet and outlet, a passage within said housing providing a gas flow path between said inlet and outlet, a valve seat within said housing defining a peripheral boundary around said passage, a valve member in said housing adapted to close said valve seat to restrict said passage, a control member adapted to be connected to a power actuator external of said housing for selectively opening and closing said valve member on said valve seat, lost motion connection means between said valve member and said control member, and means for adjustably limiting the closed position of said valve member to less than complete sealing engagement with said seat, said limiting means including means operative to effect selective positioning of said valve member for limiting closure on said seat independently of said lost motion connection means, said operative means being disposed within said housing and being directly engageable with said valve member, said valve member being a generally planar gate slidably disposed for reciprocation in its plane between its open and closed positions, a power actuator, said actuator having piston means responsive to fluid pressure to close said valve member, and spring means resisting movement of said piston means and biasing said valve member towards its open position, said spring means including means for substantially increasing the rate of biasing force for opening said valve member when said valve member is in or adjacent its closed position compared to the force rate applied by said spring means to bias the valve member towards its open position when the valve member is adjacent its open position.

* * * * *